United States Patent Office 3,071,015
Patented Jan. 1, 1963

3,071,015
DEVICE FOR THE PRODUCTION OF A DISCONTINUOUS ROTARY MOVEMENT
René Donguy, Vanves, France, assignor to Commissariat A L'Energie Atomique, Paris, France
Filed May 24, 1960, Ser. No. 31,293
Claims priority, application France May 27, 1959
3 Claims. (Cl. 74—88)

There are numerous devices which permit the transformation of alternating rectilinear movements into rotary movements.

Some of these devices utilise a helicoidal groove and a pin can effect a movement relative to the groove at the interior thereof.

FIG. 1 of the accompanying drawing shows a device of this type; a rod 1 is subjected to an alternating rectilinear movement transmitted by a single-acting piston 2 undergoing displacement in a cylinder 3, the inlet and outlet valves of which are indicated diagrammatically by apertures 4 and 5; the rod 1 is coupled for translatory movement, through the intermediary of a system of two discs 1' and 1" carried by the rod and including ball-bearings if desired, to a cylindrical part 6, the assembly of the part 6 and the rod 1 undergoing displacement within a second cylinder 7; the part 6, freely mounted with respect to the rod 1, can effect rotational movements relative thereto; the part 6 includes a helicoidal groove 8 in which is located a pin 9 connected to the cylinder 7. The total travel of the part 6 in the cylinder 7 corresponds to passage of the pin 9 along the whole of the groove 8, which becomes transformed into a helicoidal displacement over an angle determined by the part 6; the latter transmits the component of rotation of the helicoidal movement to a splined shaft 10; the rotary movement otbained about the axis is alternate.

The present invention is directed to a device for the creation of a discontinuous rotary movement of the kind comprising a cylindrical part on which alternating rectilinear forces are exerted and which, by means of a system comprising a helicoidal groove and a pin traversing it, is subjected to helicoidal displacements which are transformed into rotary movement, for example by means of a splined shaft.

This device is essentially characterised in that it comprises, between the cylindrical part and the cylinder in which it undergoes displacement, an intermediate cylindrical sleeve, adjusted to the part and to the cylinder and means for connecting the sleeve to and for disconnecting it from the cylinder, the helicoidal groove/in systems being carried by the cylindrical part/intermediate sleeve system.

The helicoidal groove can be carried by the intermediate sleeve; the pin is then carried by the cylindrical part undergoing displacement inside the sleeve, when the sleeve is connected to the cylinder, the pin is fixed and, since the helicoidal groove is constrained to traverse it, the cylindrical part describes a helicoidal movement.

When the intermediate sleeve is disconnected from the exterior cylinder and the alternating forces are exerted on the cylindrical part, the latter undergoes rectilinear displacement, while the intermediate sleeve rotates inside the cylinder through an angle corresponding to that determined by the helicoidal groove; the splined shaft then undergoes no movement.

In a particular embodiment of the invention, the intermediate sleeve is connected to the exterior cylinder during the outward movements of the cylindrical part; during the return movements of this part, the sleeve is disconnected from the exterior cylinder; since the splined, driven shaft is moved solely during the outward movements of the cylindrical part and always has the same sense of rotation, the cylindrical part and the intermediate sleeve are thus in the same relative position at the start of the outward movement and at the end of the return movement of the cylindrical part; successive rotations can be produced in this way which are of an angle of constant magnitude and sign.

Also, by adjustment of the connection between the intermediate sleeve and the exterior cylinder, a given cycle of successive rotations of the same or different size can be produced, for example, three rotations of (+) 40°, one rotation of (—) 40°, three rotations of (+) 40° and so on.

The helicoidal groove can be disposed inside the intermediate sleeve and the pin on the cylindrical part.

The alternate displacement of the cylindrical part can be obtained through the intermediary of a mechanical member, for example a rod, subjected to an alternating rectilinear displacement, the mounting can be effected in such a manner that this part can undergo rotary movement on the member.

The alternate displacement of the cylindrical part can also be controlled directly in a pneumatic manner; for example, a gas under pressure is made to act alternatively on each of the faces of the cylindrical part; this therefore operates as a double-acting piston, which should also be capable of turning within its cylinder.

The system for connecting together the intermediate sleeve and the exterior cylinder can be formed very simply by a lateral rod disposed in the two contiguous walls formed by the sleeve and the cylinder; orifices in the wall of the sleeve are distributed for this purpose over all the periphery of the sleeve; an external peripheral neck can also be provided to this end on the sleeve; this system can be controlled pneumatically, in such a manner that the whole device only utilises a single power unit.

According to a particular feature of the invention, the displacement of the cylindrical part, both outward and return, can be reduced by means of retractable abutments which in the operative position make contact with the internal surface of the intermeditae sleeve; these abutments are mounted radially or tangentially; their movement can be effected pneumatically; reduction of the displacement of the cylindrical part permits elementary rotations of the splined shaft to be produced, of a variable angle less than the angle determined by the helicoidal groove.

Referring to the accompanying diagrammatic FIGS. 2 and 3, there is described below an example given without limitation of the operation of the improvement in devices for the production of a discontinuous rotary movement.

Figure 1:
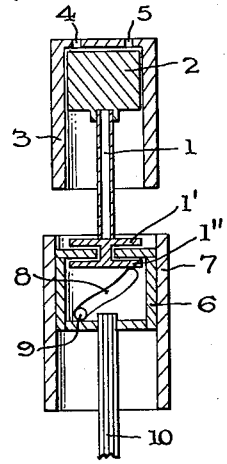
Figure 3:
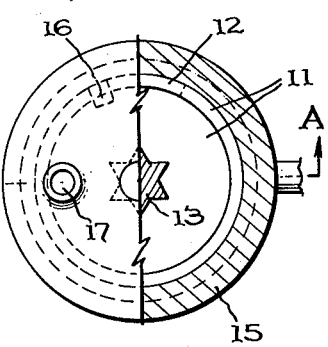
FIG. 3 shows a part-section, part-elevational plan view along BB of FIG. 2.

As shown in these figures, the driving cylindrical part is constituted by a piston 11 carrying a helicoidal groove 12, the two ends of which are spaced angularly by π/4; the piston 11 is slidingly mounted on a driven splined shaft 13, the sole possible movement of which is a rotary movement; the piston 11 undergoes displacement inside a cylindrical sleeve 14 disposed inside an external cylinder 15; the internal surface of the sleeve 14 carries a pin 16 constrained to undergo displacement in the groove 12; the total travel of the piston 11 permits relative displacement of the pin 16 from one end of the groove 12 to the other; a compressed gas is admitted alternately by orifices 17 and 18 located in the external cylinder 15 into one part or the other of the piston 11; a pin 19 connected to a piston 20 permits the sleeve 14 to be connected to the external cylinder 15; this pin 19 also forms an abutment member for the piston 11 (position shown in FIG. 2); in this position corresponding to interconnection of the intermediate sleeve with the external cylinder, a spring 21 alone acts on the piston 20; disconnection is controlled pneumatically by means of a compressed gas supplied by way of electric valve B and a conduit 22 to the space defined between the piston 20 and the cylinder 15; this system is located at the midpoint of the stroke of the face 11' of the piston 11.

Figure 2:
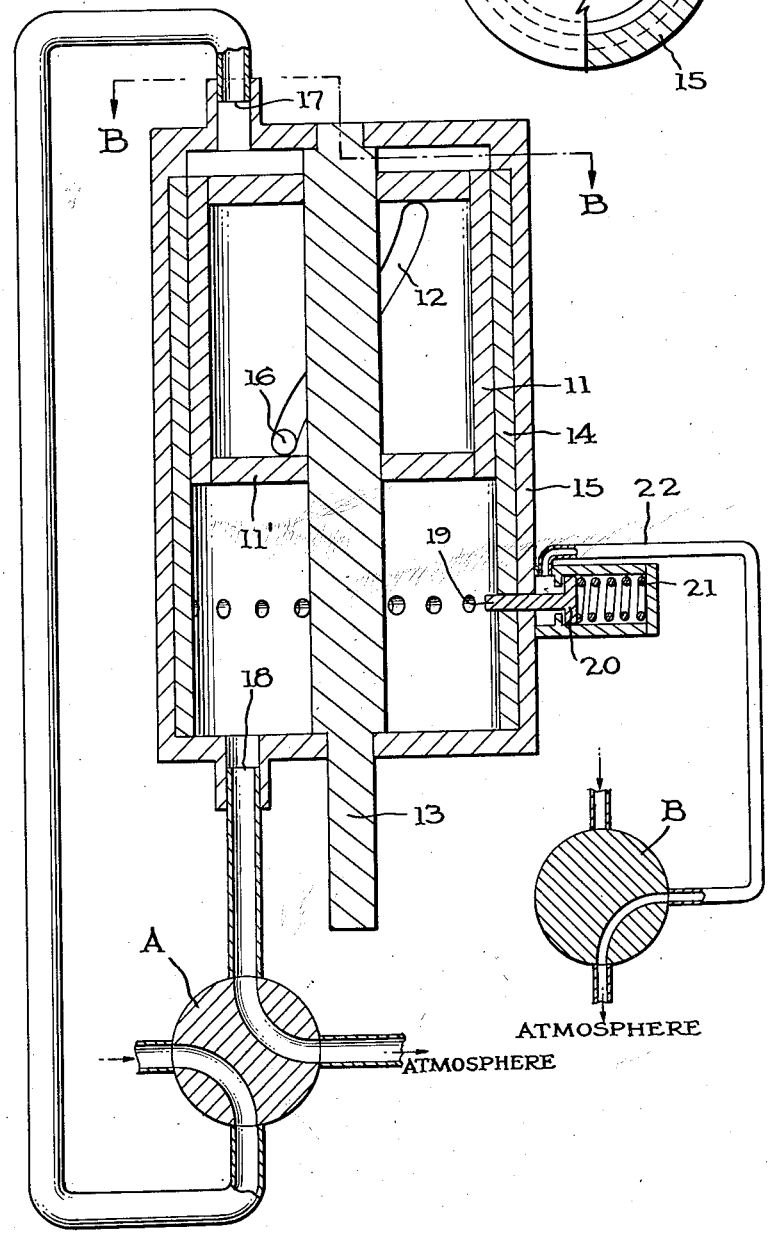
FIG. 2 shows a view in axial section along AA of FIG. 3 of an improved device, according to the invention, in which the operative forces are created by a gas under pressure.

The device is designed to operate in the following manner:

With the piston 11 in the position shown in FIG. 2 (pin 19 driven into the sleeve 14), a compressed gas is introduced through the orifice 17 by means of an electric valve A; this gas urges the piston 11 to the midpoint of its travel; the piston 11 effects a helicoidal displacement through the angle $$+\frac{\pi}{8}$$

the sleeve 14 is fixed; a rotation of $$+\frac{\pi}{8}$$

is transmitted to the splined shaft 13; at the end of this outward movement, the sleeve 14 is disconnected from the exterior cylinder 15 by retraction of the pin 19 by introducing the compressed gas at 22; at the same time, compressed gas is supplied to the orifice 18 by means of the electric valve A, whilst the electric valve A closes orifice 17; the piston 11 effects a solely translatory return movement; the sleeve 14 thus turns through an angle of $$\left(+\frac{\pi}{8}\right)$$

the splined shaft 13 is not actuated; the pin 19 is again pushed into its position of abutment by interrupting the flow of compressed gas at 22 by valve B, which permits a new rotation $$\left(+\frac{\pi}{8}\right)$$

of the splined shaft 13 to be produced by reversing the action of the two electric valves (outward half-movement of the piston 11); the sleeve 14 is then disconnected from the cylinder 15 so as to restore the piston 11 to its original longitudinal position after again appropriately operating the electric valves.

As can be seen in FIG. 2, a series of openings are provided in sleeve 14. These openings are equidistant and are arranged about the periphery of sleeve 14 in a plane at right angles to the axis of the sleeve. The spacing of these openings is such that rod 19 locks the sleeve 14 against rotation at the end of each step of rotation. A suitable spacing for these openings is, for example, 22.5°.

With this device, rotations of $$\left(-\frac{\pi}{4}\right), \left(+\frac{\pi}{8}\right), \left(-\frac{\pi}{8}\right)$$

or successive rotations of $$\left(-\frac{\pi}{4}\right)$$

or of $$\left(+\frac{\pi}{8}\right)$$

or of $$\left(-\frac{\pi}{8}\right)$$

of the splined shaft 13 can be produced as required in any desired order.

The association with the device of a supplementary connection system or latch permits rotations of $$\left(\pm\frac{\pi}{4}\right)$$

to be produced; the travel of the pin 19 of this second system is then such that connection occurs without the pin 19 ever passing the interior surface of the intermediate sleeve 14 (abutment operation suppressed).

It is to be noted that the piston 11 can clearly be actuated in any other manner, for example by means of a mechanical member subjected to an alternating rectilinear movement or by hydraulic or electromagnetic means.

What I claim is:

1. In a mechanism for converting reciprocating movement into step by step rotary movement, a cylinder, a sleeve mounted for rotation in said cylinder, a pressure responsive piston mounted for reciprocation in said sleeve, a shaft passing axially through said piston and journalled in said cylinder, means for connecting said rod and said cylinder for the step by step rotary movement, means for selectively admitting a pressure medium into said cylinder on opposite sides of said piston, connecting means including a helical groove and a pin in said groove between said sleeve and said piston, resiliently urged means for connecting said sleeve and said cylinder against relative rotation and means for releasing said resiliently urged means to disconnect said sleeve and said cylinder.

2. In a mechanism as described in claim 1 said resiliently urged means comprising a rod mounted for reciprocation through the wall of said cylinder and a plurality of apertures spaced at even intervals about the periphery of said sleeve receiving said rod.

3. A mechanism as described in claim 2 in which said rod passes through the wall of said cylinder along a radius of said cylinder and of said sleeve.

References Cited in the file of this patent

UNITED STATES PATENTS

| | | |
|---|---|---|
| 1,474,338 | Gartin | Nov. 13, 1923 |
| 1,806,083 | Roberts | May 19, 1931 |
| 2,398,231 | Kott | Apr. 9, 1946 |
| 2,757,938 | Crowder | Aug. 7, 1956 |
| 2,791,909 | Rick | May 14, 1957 |
| 2,882,862 | Waldorff et al. | Apr. 21, 1959 |
| 2,883,144 | Kendig | Apr. 21, 1959 |